(12) United States Patent
Siegel et al.

(10) Patent No.: US 7,613,634 B2
(45) Date of Patent: Nov. 3, 2009

(54) METHOD AND SYSTEM FOR PERFORMING ELECTRONIC RETAILING

(75) Inventors: Brian M. Siegel, Washingtonville, NY (US); Thomas Marchesello, Carlsbad, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 2012 days.

(21) Appl. No.: 09/745,669

(22) Filed: Dec. 21, 2000

(65) Prior Publication Data

US 2002/0082931 A1 Jun. 27, 2002

(51) Int. Cl.
*G06Q 30/00* (2006.01)
(52) U.S. Cl. .......................................... 705/26; 705/37
(58) Field of Classification Search .................. 705/26, 705/27; 345/153
See application file for complete search history.

(56) References Cited

U.S. PATENT DOCUMENTS

| | | | | |
|---|---|---|---|---|
| 5,047,614 A | * | 9/1991 | Bianco | 235/385 |
| 5,324,922 A | | 6/1994 | Roberts | 235/375 |
| 5,754,681 A | | 5/1998 | Watanabe et al. | 382/159 |
| 5,774,874 A | * | 6/1998 | Veeneman et al. | 705/27 |
| 5,869,819 A | | 2/1999 | Knowles et al. | 235/375 |
| 5,905,248 A | | 5/1999 | Russell et al. | 235/462 |
| 5,918,211 A | | 6/1999 | Sloane | 705/16 |
| 5,918,214 A | | 6/1999 | Perkowski | 705/27 |
| 5,938,726 A | | 8/1999 | Reber et al. | 709/217 |
| 5,950,173 A | | 9/1999 | Perkowski | 705/26 |
| 5,971,279 A | | 10/1999 | Raistrick et al. | 235/472.01 |
| 5,978,773 A | | 11/1999 | Hudetz et al. | 705/23 |
| 5,986,651 A | | 11/1999 | Reber et al. | 345/335 |

(Continued)

OTHER PUBLICATIONS

"The Internet Unplugged" Wallace, Bob. Forbes. Dec. 13, 1999. Informationweek.com.*

(Continued)

*Primary Examiner*—James Zurita
(74) *Attorney, Agent, or Firm*—Mayer & Williams PC; Karin L. Williams, Esq.; David B. Bonham, Esq.

(57) ABSTRACT

A bar code scanning and information retrieval system is integrated into a consumer electronic device that has an otherwise main and different function or purpose. Location determining technology, or a user interface through which location-specific information is provided, may be added to the bar code scanning and information retrieval system. A user may readily obtain information regarding the vendor at the location where the product is scanned and other vendors of the scanned product in the vicinity of the scanning device. Information can be provided to the user concerning nearby vendor location, maps to these vendors and product pricing and availability at these vendors, for example. Scanning and memory capability can be provided in connection with a non-Internet-ready portable consumer good and that scanned information can be subsequently transferred to an Internet-ready device by means of removable memory. Scanned information pertaining to a primary product may be used to obtain information from a web site regarding secondary consumer products that are related the to primary consumer product. Scanning a product code may automatically link a user to a web site or other location on a computer network, such as the Internet, which provides information related to the product whose product code was scanned. Thus, scanning the bar code acts as an instruction to a web browser to access a web site associated with the scanned bar code.

4 Claims, 4 Drawing Sheets

U.S. PATENT DOCUMENTS

| | | | | |
|---|---|---|---|---|
| 5,992,752 | A | 11/1999 | Wilz, Sr. et al. | 235/472.01 |
| 6,012,102 | A | 1/2000 | Shachar | 710/5 |
| 6,014,634 | A | 1/2000 | Scroggie et al. | 705/14 |
| 6,027,024 | A | 2/2000 | Knowles | 235/472.01 |
| 6,181,326 | B1* | 1/2001 | Takahashi | 345/158 |
| 6,317,718 | B1* | 11/2001 | Fano | 705/1 |
| 6,448,979 | B1* | 9/2002 | Schena et al. | 715/741 |
| 6,587,835 | B1* | 7/2003 | Treyz et al. | 705/14 |
| 6,652,455 | B1* | 11/2003 | Kocher | 600/300 |
| 2001/0038547 | A1* | 11/2001 | Jigour et al. | 365/43 |

OTHER PUBLICATIONS

"The New Way to Shop" Forbes.com. Mar. 3, 2000.*
"Swipe your shopping" (Field, Chris. Mar. 11, 1998. The Times).*
Pages from www.qode.com excised using web.archive.org—Oct. 18, 2000.*
Press Release—"Qode Teams with QRS to Give On-Land and On-line Retailers Advanced Marketing Capabilities" Oct. 30, 2000.*
"Get Ready to Pocket a Personal E-shopping" (Pradnya, Joshi. Oct. 22, 2000. South Florida Sun-sentinel).*
"Swipe your shopping"; Chris field; The Times; London (UK); Mar. 11, 1998.*
http://www.barpoint.com/html/home/welcome_letter.cfm.
http://www.symbol.com/products/software/software_softwaredata_storewav.html.
http://www.symbol.com/products/mobile_computers/mobile_ppc_ppt2700.html.
http://www.symbol.com/news/pressreleases/press_releases_retail_consumer.html.

* cited by examiner

METHOD AND SYSTEM FOR PERFORMING ELECTRONIC RETAILING

FIELD OF THE INVENTION

The present invention relates generally to methods and systems by which users can obtain information regarding a retailable or consumer product, and more particularly to methods and systems by which a user can obtain information regarding a retailable or consumer product on the basis of encoded information, for example, on the product itself or its associated packaging or advertisements.

BACKGROUND OF THE INVENTION

Methods and apparatuses exist for scanning a bar code and providing a modicum of information about the product corresponding to the bar code. For example, U.S. Pat. No. 5,047,614 describes a method and apparatus in which a consumer uses a portable bar code scanner to enter desired goods into memory by scanning bar codes on, for example, containers, coupons, advertisements and pamphlets furnished by a store. The memory is then read by a store terminal, which can compile a printed shipping list and/or transmit the order to a warehouse environment for manual and/or automatic order picking. For example, the memory can be read by the store terminal over a telephone line via a modem or the memory can be in the form of a removable "smart card" which can be read by the store terminal. Further information can be found in U.S. Pat. No. 5,047,614.

U.S. Pat. No. 5,774,874 provides a system for registering items selected by a registrant from a plurality of participating merchants for subsequent communication to a prospective gift purchaser for the registrant. The system includes a computer system that contains identifying information about the registrant. A portable input and storage device is provided that can be carried by the registrant into a plurality of participating stores. The portable input and storage device is capable of receiving and storing information regarding gifts that the registrant desires to receive. The input and storage device stores a unique identifier for the particular merchant from which each desired gift may be obtained. A transfer device is provided connected to the computer system that receives the information regarding the registrant's desired gifts from the portable input and storage device and transfers the information to the computer system. Finally, a prospective purchaser interface device is provided that allows the prospective purchaser to view, sort or print a list of the gifts desired by the registrant and from which particular merchant those gifts can be obtained. Further information can be found in U.S. Pat. No. 5,774,874.

Symbol Technologies sells a mobile computer that allows bar code scanning and wireless local area network (LAN) connectivity with a Microsoft Pocket PC platform. The information is used within the LAN for price, inventory and stock management, bridal registries, gift baskets and so forth. The UPC information can also be downloaded to a personal World Wide Web page hosted on an Internet server (e.g., http://www.Fastfrog.com) to establish a wish list, which can be organized and e-mailed to others. Additional information can be found at http://www.symbol.com.

U.S. Pat. No. 5,918,211 describes a system and method for influencing and potentially altering a consumer's purchase decisions at the point-of-purchase in a retail store, using a portable bar code scanner that is in constant wireless communication with the store and a retailer/manufacturer's computer/controller. The consumer uses the portable bar code scanner to scan products in the store. As the consumer scans the product bar code, the portable bar code scanner identifies the product and price, maintains a running total for purchases, and alerts the consumer when a scanned product is currently being offered with some kind of promotion, so that the consumer can to take advantage of the promotion. Alternatively, the consumer will be identified before beginning shopping by their frequent shopper card, so that the computer/controller, in communication with the portable bar code scanner, can utilize the consumer's past purchase history and offer the consumer promotional product discounts. Further information can be found in U.S. Pat. No. 5,918,211.

U.S. Pat. No. 5,978,773 describes a system and method for using identification codes found on ordinary articles of commerce to access remote computers on a network. In one instance, a computer is provided having a database that relates UPC numbers to Internet network addresses ("URLs"). To access an Internet resource relating to a particular product, a user enters the product's UPC symbol manually, by swiping a bar code reader over the UPC symbol, or via other suitable input means. The database retrieves the URL corresponding to the UPC code. This location information is then used to access the desired resource. Further information can be found in U.S. Pat. No. 5,978,773.

U.S. Pat. No. 5,950,173 discloses a system and method for finding and serving consumer product-related information over the Internet to consumers in retail shopping environments and elsewhere (at home, work and on the road). The system includes Internet information servers that store information pertaining to the UPC pre-assigned to each consumer product registered with the system, along with a list of Uniform Resource Locators (URLs) that point to the location of one or more information resources on the Internet, e.g. World Wide Web sites, which relate to such registered consumer products. Upon entering the UPC number into the system using a conventional Internet browser program running on any computing platform or system, the menu of URLs associated with the entered UPC number is automatically displayed for user selection. The displayed menus of URLs are categorically arranged according to specific types of product information such as, for example: product specifications and operation manuals; product wholesalers and retailers; product advertisements and promotions; product endorsements; product updates and reviews; product warranty/servicing; related or complementary products; product incentives including rebates, discounts and/or coupons; manufacturer's annual report and 10K information; electronic stock purchase. Web-based techniques are disclosed for collecting the UPC/URL information from manufacturers and transmitting the same to the Internet-based databases of the system. Further information can be found in U.S. Pat. No. 5,950,173

U.S. Pat. No. 5,918,214 describes a system and method for finding product and service related information on the Internet. The system includes Internet servers that store information pertaining to a Universal Product or Service Code (UPC or USC) pre-assigned to each product and service registered in the system, with Uniform Resource Locators (URLs) that point to the location of one or more information resources on the Internet, e.g. World Wide Websites, related to such products or services. Each client computer system includes an Internet browser or Internet application tool, which is provided with an "Internet Product/Service Information (IPSI) Finder" button and a "Universal Product/Service Number (UPSN) Search" button. When the system is in its IPSI Finder Mode, a pre-designated information resource (e.g., advertisement, product information, etc.) pertaining to any commercial product or service registered with the system is automatically accessed from the Internet and displayed from the Internet browser by entering the registered product's UPC or the registered service's USC into the Internet browser. When the system is in its "UPSN Search Mode," a pre-designated information resource pertaining to any commercial product or service registered with the system is automatically accessed from the Internet and displayed from the Internet browser by simply entering the registered product's trademark(s) (or servicemark(s)) and/or associated company name into the Internet browser. Further information can be found in U.S. Pat. No. 5,918,214.

Bar Point provides a system in which a customer uses the UPC code on a product to obtain product-specific information from the Internet by accessing a remote computer on a network (i.e., Bar Point.com). The remote computer/network can be accessed using wireless devices including Palm organizers, Windows CE devices, Interactive Pagers and cellular phones. A search is done and information is provided to the user, including product information, manufacturer contact information, comparative price information from online sources, direct links to purchase the product from a variety of e-commerce vendors, and direct links to reviews and other product-related reports. Further information can be found at http://www.barpoint.com.

Each of the above systems utilizes specific devices and apparatuses, which therefore require separate purchase and installation/setup by consumers, thereby potentially limiting the penetration of these devices and apparatuses into the consumer marketplace. Few consumer products penetrate the consumer marketplace beyond 20%. Even the highly successful personal computer took many years before breaking the 50% barrier. Without significant market penetration rapidly, these products will remain a novelty.

Furthermore, due to the lack of penetration and use of these devices and apparatuses by consumers, retailers have not developed associated systems that provide consumers with the benefits that would otherwise come from the use of such systems or devices. Moreover, due to the lack of advantages provided to such users, there are no incentives for new purchasers to purchase these devices and apparatuses. Essentially, there exists a chicken and egg problem. Without a widespread user base, few retailers will invest their resources in developing products and related advertising campaigns to take advantage of these devices further exacerbating the lack of use/purchase of these devices.

The present invention is therefore directed to the problem of developing a method and apparatus for enabling consumers to conveniently obtain information regarding retailable or consumer products while also encouraging retailers to develop related systems that take advantage of the existence of such methods and apparatuses.

SUMMARY OF THE INVENTION

The present invention solves these and other problems by integrating a bar code scanning and information retrieval system into a consumer electronic device that has an otherwise main and different function or purpose. By utilizing different kinds of consumer electronic devices that are initially purchased for other purposes, the present invention enables significantly deeper product penetration into the marketplace, thereby ensuring a significant installed user base that provides incentives for development of concomitant systems on the retailer side. Thus, the present invention acts as a catalyst for retailer development.

According to one other aspect, location-determining technology is added to the bar code scanning and information retrieval system. The combination of bar code and geographic coordinates can be used to provide location specific information to a consumer. Thus, the present invention enables a user to readily obtain information associated with the vendor at the location where the product is scanned (if, for example, this location is a retail establishment) and other vendors of the scanned product in the vicinity (e.g., within a number of miles selected by the user) of the scanning device or at any other location of interest. Information can be provided to the user concerning nearby vendor location, maps to these vendors and product pricing and availability at these vendors, for example.

According to another aspect of the present invention, scanning and memory capability can be provided in connection with a non-Internet-ready portable consumer good (typically a portable consumer good commonly and frequently carried by consumers), and that scanned information can be subsequently transferred to an Internet-ready device by means of removable memory.

According to yet another aspect of the present invention, scanning a product code automatically links a user to a web site or other location on a computer network, such as the Internet, which provides information related to the product whose product code was scanned. Thus, scanning the bar code acts as an instruction to a web browser to access a web site associated with the scanned bar code.

In yet another aspect of the invention, scanned information pertaining to a primary product is used to obtain information from a server regarding secondary consumer products that are related the to primary consumer product.

These and other objects and advantages will become readily apparent to those of ordinary skill in the art upon reading the Detailed Description and Claims to follow.

DETAILED DESCRIPTION

At this point, it is worthy to note that any reference herein to "one embodiment" or "an embodiment" means that a particular feature, structure, or characteristic described in connection with the embodiment is included in at least one embodiment of the invention but not necessarily all embodiments. The appearances of the phrase "in one embodiment" in various places herein are not necessarily all referring to the same embodiment.

In general, consumer products are typically associated with a unique product identifier, such as a Uniform Product Code (UPC), which is usually displayed in at least one of several possible locations: (i) on the product itself, (ii) on packaging associated with the product, (iii) on the product shelving, (iv) in advertising materials, pamphlets and coupons, and so forth. Often, the UPC is displayed in several of these locations.

The UPC is sometimes affixed to the product or packaging in the form of a binary bar code, e.g., a series of lines whose width represents a binary "zero" or "one." The binary code can be converted to decimal or ASCII characters or other human readable format, for example, by a computer.

As used herein the term "consumer product" refers to any item that is marketed to the public or otherwise sold for retail. For example, but without limitation, consumer product can include consumer products ranging from books to consumer electronics, from cars to power saws, and so forth.

UPC codes are typically printed in a format that allows them to be "scanned" (i.e., converted into machine-readable form) using a device with UPC scanning capabilities (i.e., a device that is capable of perceiving the UPC code and converting it into machine readable form). Bar code scanning devices capable of scanning UPC's are known in the art. Of course, other characters can be optically scanned besides UPC codes. For example, a device can be provided with the capability to optically scan magnetic ink character recognition (MICR) codes such as those found at the bottom of checks, bills and so forth. As used herein, a consumer electronic device includes any consumer product having a power source, either direct current (DC) based (e.g., battery) or alternating current (AC) based. Examples of consumer electronic devices include but without limitation radios, compact disk (CD) players, mini-disc players, cassette players, "boom boxes", two-way radios, telephones, pagers, cameras, camcorders, laptop computers, televisions, video games, wrist watches and so forth. Some of these devices are portable and some need not be.

Exemplary Embodiments

Figure 1:
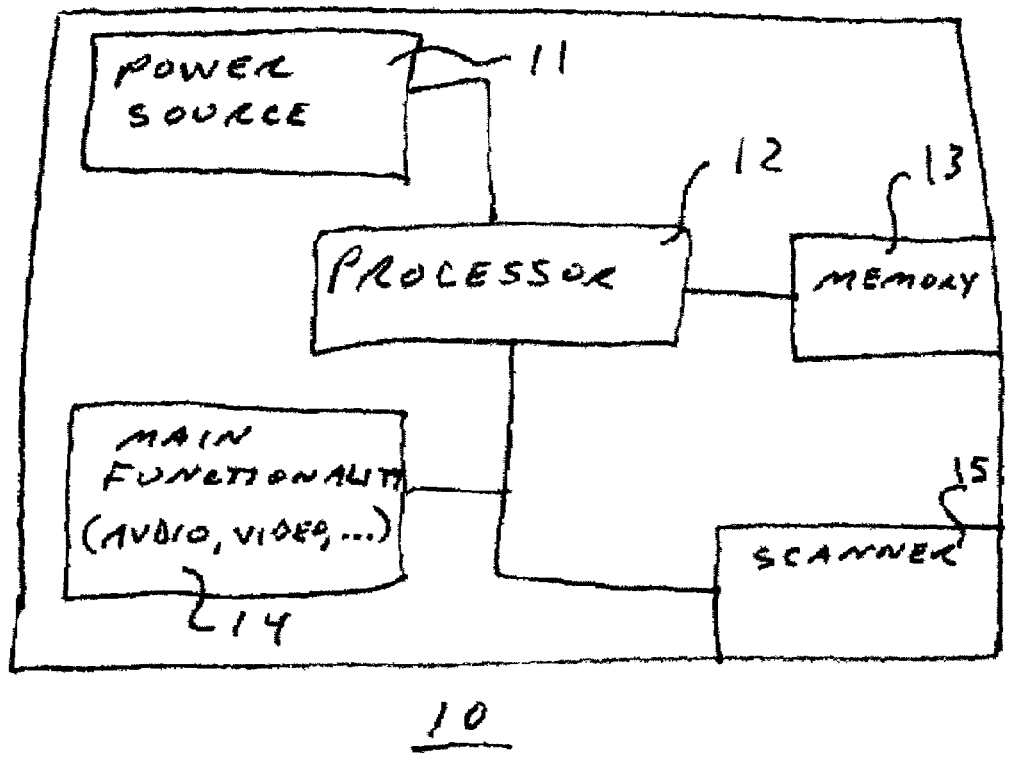
FIG. 1 depicts an exemplary embodiment of one aspect of the present invention in a block diagram format.

Referring to FIG. 1, according to a first embodiment of the present invention, a consumer electronic device 10 having a main function that is different from scanning bar codes is used to host a bar code scanning and information retrieval system. The consumer electronic device 10 includes a power source 11, a processor or controller 12, a memory 13, which is preferably removable, a scanner 15 and other main functionality 14 depending upon the type of consumer electronic device. The combination of the scanner 15 and memory 13 comprise what is frequently referred to herein as a "scanning and storage device". Typically, consumer electronic devices include processors as well as power sources. These can easily be modified to provide additional power and processing capability to a bar code scanner and a removable memory, which are only actuated when being operated by a user. For example, the processor's programming is modified to write data output from the scanner 15 to the memory 13 when a user actuates the scanning function by, for instance, pressing a button on the device 10.

Figure 2:
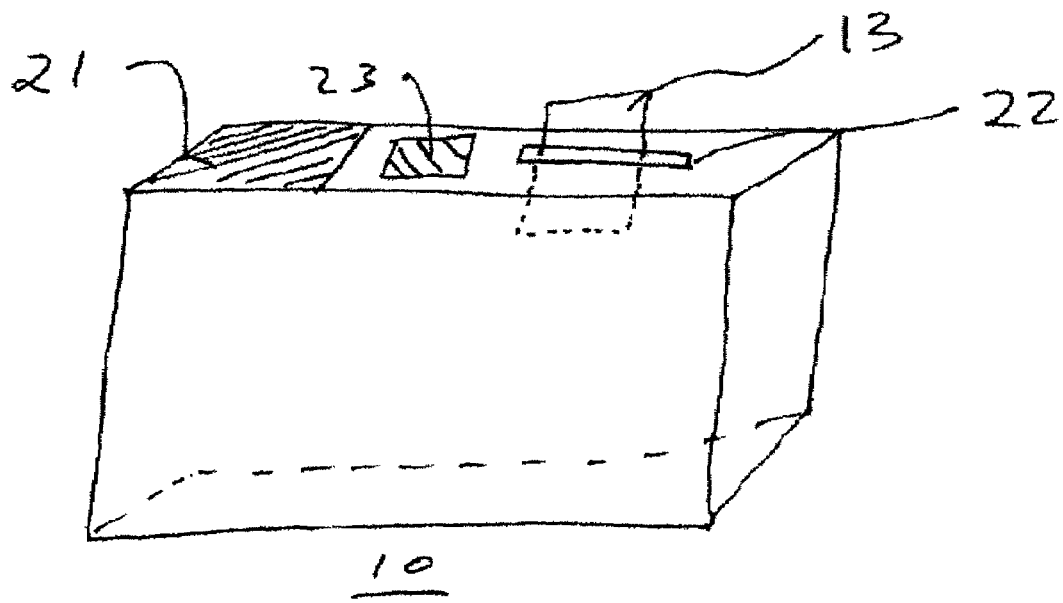
FIG. 2 depicts the exemplary embodiment of FIG. 1 in a three dimensional view.

FIG. 2 depicts the consumer electronic device 10 of FIG. 1 in three-dimensional view. In the embodiment shown, a window 21 is disposed on one side of the consumer electronic device 10. The bar code scanner 15 is disposed behind the window 21. Thus, a user simply actuates the scanning function by pressing a button 23 on the device 10 and places the window 21 near the code to be scanned. The scanner 15 then scans the code and converts the code into a digital bit stream, which is then output to the processor 12 and stored in memory 13.

One example of the consumer electronic device 10 is a CD-player that includes a bar code scanner and a removable memory (i.e., a scanning and storage device). In this embodiment, the CD-player acts as the host device, which includes a bar code scanner and memory—perhaps a removable memory storage device, such as a smart card and associated interface. One of ordinary skill in the art will appreciate, however, that essentially any consumer electronic device will suffice for the host of the bar code scanning and memory device.

In this exemplary embodiment, the bar code scanner and removable memory device are not part of the main functionality of a CD-player, hence consumers will no doubt purchase the CD-player for its functionality as a CD-player. At the same time, however, the consumer will obtain also a bar code scanning and memory device that is capable of scanning bar codes and storing them to memory, for example, in a smart card, which can be removed and inserted in another system for connecting to a web site, which may be specified by the bar code.

Various embodiments of consumer electronic device 10 with attendant portable scanning and storage devices have the ability to scan UPC symbols and store the codes in memory, but may not have the ability to access the Internet. Such a portable scanning and storage device can be, for example, a stand-alone UPC scanner with attendant memory. The portable scanning and storage device can be incorporated into commonly used portable consumer goods, such as portable electronic devices that do not have access to the Internet, including portable radios, portable mini-disc players, portable compact disc players, portable cassette players, "boom boxes", two-way radios, portable telephones, pagers, cameras, camcorders, laptop computers, portable televisions, portable video games, wrist watches, and so forth.

The portable scanning and storage device can also be incorporated into non-electronic, portable consumer goods such as pens, clothing (e.g., gloves), pocketbooks, and so forth. In these embodiments, additional circuitry may be necessary to provide the functionality. For example, the memory, controller (processor) and scanner circuitry may be incorporated into the consumer good to enable complete functionality. Power can be provided by solar cells or batteries, for example.

The consumer electronic device 10 of the present invention may take on a number of additional forms. For example, in some embodiments, the host devices 10 include the ability to access the Internet, which host devices are then augmented with bar code scanning capability in accordance with one aspect of the present invention. In these devices, removable memory is not required, but may be included as a further capability.

Examples of such host devices include stationary Internet-ready devices, such as personal computers (PCs) or WebTV appliances, augmented with UPC scanning capabilities. One possible implementation includes a PC with a hand held scanner capable of reading bar codes. Other examples of host devices include portable Internet-ready devices, such as Palm organizers, Windows consumer electronic devices, interactive pagers and cellular phones, which are augmented with UPC scanning capabilities.

Bar Code Scanner

The bar code scanner of the present invention may be simply a solid-state laser with associated photoreceptor, etc. having a window 21 disposed on a portion of the host device, such as an edge of the host device 10, as shown in FIG. 2. The user simply presses a button 23 on the side of the host device 10 to activate the bar code scanner and then passes the bar code across the window 21 on the device 10. The output of the bar code scanner is automatically written to memory under control of a processor, which may or may not be part of the consumer electronic device 10 hosting the scanner.

Alternatively, the bar code scanner could be a pen-like scanner that attaches to the device. In this embodiment, the pen could be removable and attached to any similarly equipped host device.

Removable Memory

In some embodiments, upon scanning a bar code, the processor 12 automatically stores the bar code in the removable memory 13. Shown in FIG. 2, the removable memory can be a card inserted into a slot 22 on an edge of the consumer electronic device 10.

The removable memory may be any memory type that can be easily removed from one device and inserted in another. Some examples include smart cards, removable disk drives, diskettes, re-writable CD-ROMS, cards with magnetic strips, magnetic discs, flash memory, random access memory chips and memory sticks. The removable storage medium (also referred to herein as removable memory medium) can be removed from the scanning device 10 and inserted into an Internet-ready device 30 (see, e.g., FIG. 3, discussed further below).

Internet Access

In embodiments involving devices with Internet access, scanning the bar code can actuate the Internet browser and cause the browser to access one or more web sites on the Internet. These web sites access databases whose contents are accessible by specifying the uniform product code, as well as other information, such as global position. The web site can be accessed using a predetermined URL or using the bar code as the URL (or using the bar code to look up a URL). In any case, simply actuating the bar code scanner can cause the Internet ready device to access a web site on the Internet, which web site can be specified by the bar code on the product being scanned. This enables a user to quickly obtain information regarding the product, including unadvertised specials, related offers, etc., as discussed below.

Alternatively, once the UPC symbol data is scanned into the portable scanning and storage device 10, it can be downloaded by any number of known methods to a stationary or portable Internet-ready device 30, such as a personal computer, WebTV appliance, Palm organizer, Windows consumer electronic device, interactive pager and cellular phone, and so forth. For example, the data can be downloaded using removable memory or by transmission over the airwaves or through an electrical or optical cable.

Figure 3:
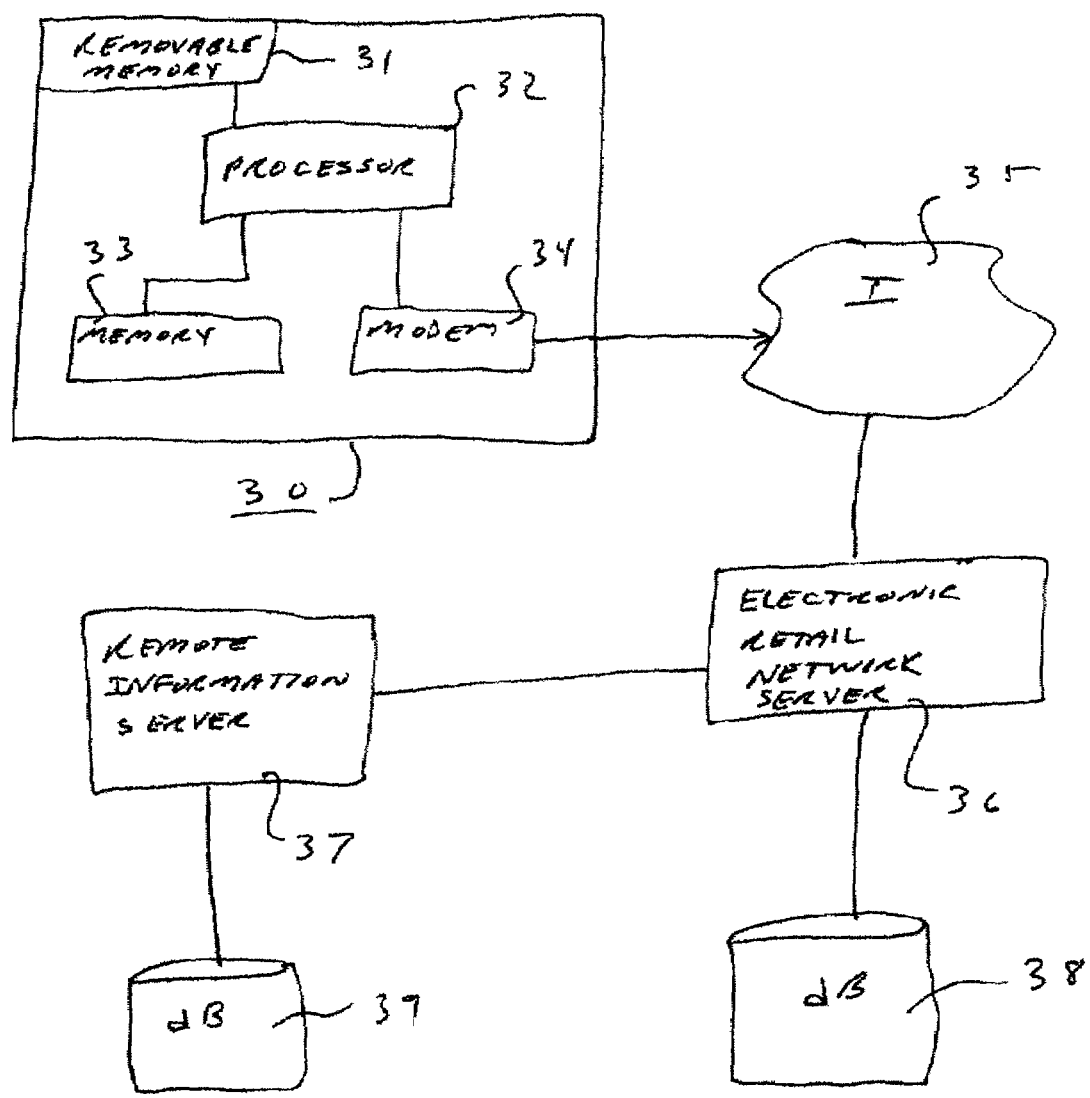
FIG. 3 depicts an exemplary embodiment of a system according to another aspect of the present invention in block diagram format.

As a specific example, turning to FIG. 3, the bar code stored on removable memory 13 can be used to access information related to the product represented by the bar code when inserted into another device 30 that is couplable to the Internet 35. Device 30 includes a processor 32, a memory 31 that can receive the removable memory 13, another memory 33 and an Internet communication device 34 (e.g., a modem).

Once the device 30 receives the removable memory 13 with the stored bar code, upon activation by a user, the device 30 can access the Internet 35 for information related to the bar code. For example, the stored bar code can be converted to a web site URL, which is then used by a browser application to connect to a web site on the Internet 35 that includes product information about the product represented by the stored bar code. Thus, coupled to the Internet 35 is one or more servers 36, 37 (which can be an electronic retail network (discussed further below), each of which is coupled to a database 38, 39 storing information regarding the consumer products. This information can be accessed by simply specifying the consumer product code.

Hence, in accordance with various embodiments of the present invention, once a UPC symbol is scanned, the resulting machine readable data can be: (a) immediately made available to a server (such as an electronic retailing network) via the Internet, (b) stored to memory, making it available for later download, or (c) both made available to the server via the Internet and stored to memory.

Thus, the embodiments of the present invention scan UPC bar codes, or other information bearing codes, and either store information on removable onboard memory or directly access the Internet, if the host device has Internet capability. Either way, the information can be used, for example, to comparison shop amongst participating on-line and offline vendors.

System

Figure 4:
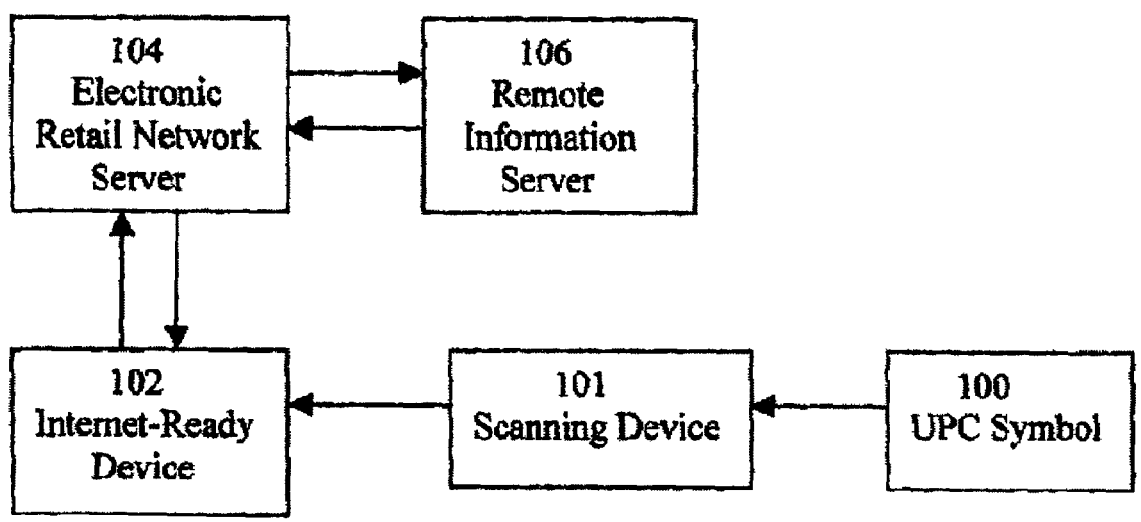
FIG. 4 depicts an exemplary embodiment of the information flow according to one aspect of the present invention.

Referring now to FIG. 4, once the UPC symbol 100 corresponding to a consumer product of interest is scanned using a scanning device 101 and once the scanned data is resident in an Internet-ready device 102 (which can be immediate if the user's device is an Internet-ready, scanning device, and which can be substantially delayed if it is not), contact is made with an electronic retailing network via the Internet, typically through a remote server 104 associated with the electronic retail network, which can be in contact with at least one other remote servers 106. Connection to the electronic retail network server 104 may be automatic.

Web Server

As will be seen in the following paragraphs, in many embodiments of the present invention, the electronic retail network can effectively operate as an e-commerce portal in which the electronic retailer acts as an interface between the user (also referred to herein as the "customer") and various vendors (also referred to herein as "retailers"), which can be either online vendors and/or offline "brick-and-mortar" vendors. This allows the electronic retail network to facilitate sales through the use of UPC codes and, in some instances, global positioning data.

In addition to the UPC code data, the customer can also provide the electronic retail network with personal profile information, including home location (to provide the customer with information concerning nearby "brick and mortar" retailers, for example), preferred vendor information (for example, on the basis of product category), the relative importance of price, the relative importance of brand, and so forth.

Simply on the basis of the UPC code, the electronic retail network can provide the customer with information concerning the scanned product (i.e., the precise product corresponding to the UPC code). Typically, this information is available from a database associated with an electronic retail network server 104, but the electronic retail network can also obtain this information from outside the electronic retail network and send this information to the user. For example, the electronic retail network server 104 can obtain this information from one or more remote information servers 106 on the Internet, using a database of appropriate URLs. This information is then typically conveyed from the electronic retail network server 104 to the customer via Internet-ready device 102.

The electronic retail network can also provide the customer with information regarding related products. By "related products" is meant both (a) complementary products by the same manufacturer (e.g., headphones in connection with a music-playing device) and (b) analogous products by other manufacturers (e.g., other music playing devices comparable to the music-playing device selected by the customer). This information can be stored, for example, within an electronic retail network database associated with an electronic retail network server 104, or this information can be transmitted to the electronic retail network server 104 from one or more additional Internet resources, for example, one or more remote information servers 106, using a database of appropriate URLs. This information is then typically sent from the electronic retail network server 104 to the customer via Internet-ready device 102. The information given to the customer in connection with complementary products can include a list of complementary products, their technical specifications, their prices at various vendors, and so forth. The customer can be given information comparing analogous products on the basis of, for example, manufacturer's suggested retail price, technical specifications and so forth.

The electronic retail network can also provide the customer with vendor-specific information concerning the scanned product or related products (i.e., analogous and/or complementary products). Such information, which can apply to both on-line and off-line vendors, includes vendor contact information, product pricing (including incentives, such as discount sales and coupons), product availability, time to delivery, warranty information, service information, and so forth. This vendor-specific information can be provided, for example, in a database associated with the electronic retail network server 104, which database may be continually updated by participating member on-line and off-line vendors.

Alternatively, this vendor-specific information can be obtained by contacting appropriate participating on-line and off-line vendors, preferably by having the electronic retail network server 104 access one or more remote information servers 106 associated with online or offline vendors via a database of URLs. Regardless of the source, this vendor-specific information is then typically sent from the electronic retail network server 104 to the customer via Internet-ready device 102.

The customer can also be provided with information concerning customer satisfaction ratings for (a) each on-line and off-line vendor (service ratings) and (b) each product (product ratings). These ratings can be established, for example, by participating customers and input into the electronic retail network by the customers. Hence, this information is typically made available to a customer Internet-ready device 102 from a database associated with the electronic retail network server 104.

The customer can sort the vendor-specific information by any of the above criteria, such as price (including any incentives), product satisfaction ratings, online or off-line purchase preference, vendor preference, service ratings, available inventory, time to delivery, length of warranty, and so forth.

Once the customer is presented with the above and any other information, the customer will be able to immediately (1) purchase the desired product online or (2) proceed to an offline vendor and purchase the product. In the event that the customer does not elect to purchase the product at this time, (1) the customer can save the UPC and/or inquiry results for a later decision and/or (2) the electronic retail network can use this information to give reminder notices to the customer and provide the customer with pricing updates (for example, to provide the customer with potential incentives, such as discount sales, coupons, and so forth). Regardless of the time of purchase, the scanned information and any related information of interest to the customer can be stored onboard the portable device or on the electronic retailing site for subsequent access.

Once a UPC code is received by the electronic retailer from the customer, and assuming that the customer consents, the electronic retailer can also provide participating vendors with the customer's personal profile preferences, allowing the vendors to actively "push" offers to customers (e.g., via e-mail). By "pushed", it is meant that a customer will be willingly given offers without having to seek them out—the customer need only express interest in a particular product or product category via a UPC scan. Frequently, the vendor will use dynamic adaptive intelligence to generate offers specific to the customer based on customer interest information.

The electronic retailer will also be able to track product inquiries and provide participating vendors with data that shows overall customer interest. This will allow the vendors, for example, to better manage their product inventory and to develop customer specific sales, i.e., sales and/or offers directed to specific customers based on past history or buying patterns.

The present invention can also allow the customer to scan the UPC of any product of interest and store the UPCs (or an associated product description) in a file. The resulting list of items can be shared with others through an online registry or through direct file transfer. This allows the customer to give a tailored "wish list" others, such as friends and family members.

This concept can be extended to include grocery shopping. By scanning the UPCs on various grocery items, the customer can create a list frequently purchased groceries. The electronic retail network can transfer the various UPC codes to various online retailers, for example, for comparison-shopping, and the customer can subsequently purchase the items over the Internet if desired. The electronic retail network can also provide the customer with additional information relating to the scanned groceries, for example, nutritional information or recipes containing the scanned groceries.

The present invention can also be used to scan their monthly billing statements, which often have the "amount due" in a UPC on the statements (e.g., most credit card companies, cable companies and other companies that do automated payments). Such statements, as well as other financial papers such as the customer's checks, also have information that can be optically scanned from the MICR codes found on the same. This information can then be used by the customer in connection with his or her personal finances. For example, the information can be downloaded to the customer's Quicken accounts for automatic payments from their accounts.

Location-based Technology

In addition to the above embodiments, the present invention provides another embodiment that enables users to obtain additional information related to a product represented by a scanned bar code, which information is not available in existing systems. By adding the knowledge of where a product's bar code is scanned to the knowledge of which bar code is scanned, one can tailor additional information to a user, such as stores selling the same device at cheaper prices or information regarding the retail establishment (i.e., vendor) where the customer is scanning the purchase.

For example, referring to FIG. 4, this information can be downloaded to the customer's Internet-ready device 102 from a database containing vendor and geographical coordinate data. This database can be, for example, associated with the electronic retail network server 104, or it can be retrieved by the electronic retail network server 104 from a remote information server 106. This arrangement will also allow the electronic retail network to present the customer with vendor-specific information regarding nearby participating vendors, including a map showing those vendors or directions to those vendors.

As an example, a customer can scan a UPC symbol 100 of a stereo component at participating Store A using a scanning device 101 associated with an Internet-ready device 102. The device 102 can then contact an electronic retail network server 104 over the Internet and transmit information concerning the UPC code as well as information regarding the global position of the Internet-ready device 102. Using this information, the electronic retail network server 104 can then supply information to the Internet-ready device 102 regarding pricing available at store A, as well as the nearby participating vendors (Store B, Store C, etc.).

Figure 5:
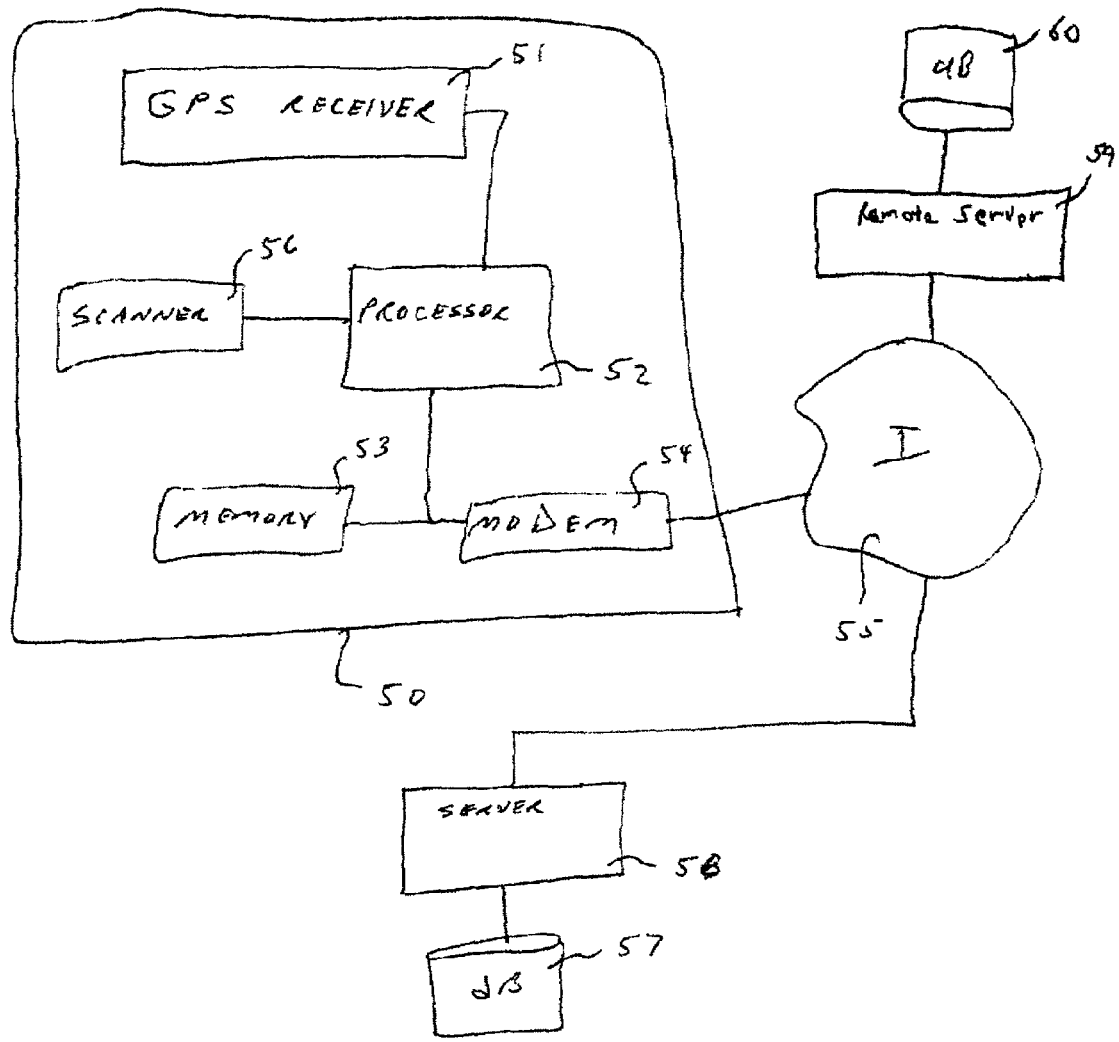
FIG. 5 depicts an exemplary embodiment of another aspect of the present invention in a block diagram format.

Turning to FIG. 5, shown therein is an exemplary embodiment 50 with location determining capability. This embodiment 50 of the present invention augments portable Internet-ready, scanning devices with location-determining technology, such as GPS-based or cell-based technology, which can be used to provide the user with location-relevant information.

An example of location determining capability is a GPS receiver 51 that receives GPS (Global Positioning System) signals and outputs latitude and longitude coordinates based on the received GPS signals. GPS receivers are well known in the art.

A GPS receiver will output the position information calculated or obtained from the GPS system. Typically, this information is in the form of longitude and latitude coordinates. A GPS receiver receives the GPS signals from the available satellites in the Global Positioning System, and using these signals determines its location. A fine position fix may take longer than a quick position determination used to locate a user within a block of the user's actual location.

Other types of location determining technology may be used, such as triangulation-based systems that output longitude and latitude coordinates. As the exact position need only be determined to within a city block, for example, to provide information regarding other retail establishments close by, a very crude position determination will suffice for this purpose. Many techniques exist to obtain these crude position determinations.

The GPS receiver provides the coordinates to the processor 52, which adds this information to the bar code information output by the scanner 56 and stored in memory 53. When accessing the Internet 55 with a transceiver couplable to a computer network, such as a cellular modem 54, as described above, the location coordinates and the bar code information can be provided to an electronic retail network server 58, which can in turn provide location-specific information to the user.

The server may convert the bar code and the geographic information (e.g., latitude/longitude coordinates) to a specific page on the web site, or to one or more records in a database coupled to the server. Alternatively, the coordinates and bar code can be used in a two variable query to a database having records that are stored in a structured database, such as provided by Oracle.

A web page associated with the specific bar code and geographic coordinates can display many geographically specific records. For example, the web page could display a map indicating other retailers carrying the same product and their current prices. In addition, the map could display other retailers carrying related products. For example, a purchaser of a CD-Player may be interested in CDs, and the web site could display a close music store.

The conversion of the bar code scanner and the geographic coordinates can be used as address locations in a matrix. In each address location, a record identification can be listed specifying local information related to the product represented by the bar code scanner. The record identification can be used to download a specific record to the web site that displays the geographic information specific to that product and geographic location.

The location-specific information may be obtained, for example, from a database 57 dedicated to electronic retail network server 58 and containing, for example, containing vendor and geographical coordinate data. Alternatively, the electronic retail network server 58 can obtain this information from a remote information server 59 having database 60 via the Internet 55. The location specific information can include nearby vendors that sell the product or interest, the location of nearby vendors that sell analogous products by other manufacturers, the location of those nearby vendors, and the price of the products at those vendors. Moreover, the electronic retail network server 58 can tailor the information to the user based, for example, on the users preference for price, manufacturer, vender, and so forth. The electronic retail network server 58 can also provide nearby vendor location to the user in several formats including a written address, written instructions as to how to get to the vendor from the scanning location, and maps containing both the scanning location and the nearby vendors of interest.

Although the above embodiments concern the use of data corresponding to the location of the device, in other embodiments, analogous information can be generated by inputting information corresponding to a location of interest, which may be different from the location of the device. For instance, a U.S. Postal Service code (e.g., a "zip code") can be input into the device by the customer, for example, by manual entry or by scanning a machine-readable zip code.

Summary

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of specific consumer electronic devices, any consumer electronic device will suffice as the host device for the bar code scanning and information retrieval system of the present invention. In addition, while several of the embodiments discuss the use of bar codes, any machine-readable inscription affixed to a product that uniquely identifies the product or product line will suffice. Furthermore, these examples should not be interpreted to limit the modifications and variations of the invention covered by the claims but are merely illustrative of possible variations.

What is claimed is:

1. An apparatus for retrieving and processing information related to a consumer product using a universal product code comprising:

a) a portable consumer device, said portable consumer device including:

(i) a portable consumer good comprising a non-electronic device that lacks the capacity for data transmission; and (ii) a scanning and storage device incorporated into said portable consumer good, said scanning and storage device comprising:

(1) a scanning element converting a printed universal product code symbol into machine readable information representative of said universal product code; and (2) a removable memory medium to which said information is stored; and b) an Internet-ready device couplable to one or more Internet-based information servers, said Internet-ready device including a removable memory medium adapted to accept said removable memory medium from said scanning and storage device.

2. A method for retrieving information related to a consumer product comprising the steps of:
  integrating a bar code scanner and a removable memory into a consumer good, wherein said consumer good comprises a non-electronic device;
  scanning a bar code of a selected consumer product using the integrated scanner and storing the scanned bar code in the removable memory;
  transferring the scanned bar code from the removable memory to a computer network; and
  accessing a web site on a computer network based on the scanned bar code, wherein said web site includes information related to the selected consumer product.

3. The method according to claim 2, further comprising converting a scanned bar code to a uniform resource locator (URL) of a web site.

4. The method according to claim 2, further comprising converting a scanned bar code and a global position to a uniform resource locator (URL) of a web site.

* * * * *

UNITED STATES PATENT AND TRADEMARK OFFICE
CERTIFICATE OF CORRECTION

PATENT NO. : 7,613,634 B2 Page 1 of 1
APPLICATION NO. : 09/745669
DATED : November 3, 2009
INVENTOR(S) : Siegel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2389 days.

Signed and Sealed this

Nineteenth Day of October, 2010

David J. Kappos
*Director of the United States Patent and Trademark Office*